(12) United States Patent
Lee

(10) Patent No.: US 7,626,642 B2
(45) Date of Patent: Dec. 1, 2009

(54) DRIVING ASSEMBLY OF AUDIO/VIDEO SYSTEM FOR A VEHICLE

(75) Inventor: Sang-Ho Lee, Seoul (KR)

(73) Assignee: Hyundai Mobis Co., Ltd. (KR)

( * ) Notice: Subject to any disclaimer, the term of this patent is extended or adjusted under 35 U.S.C. 154(b) by 850 days.

(21) Appl. No.: 10/720,350

(22) Filed: Nov. 25, 2003

(65) Prior Publication Data
US 2005/0056733 A1 Mar. 17, 2005

(30) Foreign Application Priority Data
Sep. 15, 2003 (KR) ............... 10-2003-0063543

(51) Int. Cl.
*H04N 5/64* (2006.01)
(52) U.S. Cl. ............... 348/837; 348/836; 312/7.2; 312/223.1; 361/679.01
(58) Field of Classification Search ............... 348/836, 348/837, 838, 839; 312/7.2, 223.1, 223.2; 361/679.01, 679.021; 345/905
See application file for complete search history.

(56) References Cited

U.S. PATENT DOCUMENTS

| | | | | |
|---|---|---|---|---|
| 2,042,002 A | * | 5/1936 | Hovey | 160/133 |
| 4,362,108 A | * | 12/1982 | Jenkner | 104/94 |
| 5,762,412 A | * | 6/1998 | Kim | 312/319.2 |
| 5,845,897 A | | 12/1998 | Tunkers | |
| 5,850,215 A | * | 12/1998 | Kamiya et al. | 345/204 |
| 5,912,541 A | * | 6/1999 | Bigler et al. | 318/600 |
| 5,941,615 A | * | 8/1999 | Ito et al. | 312/7.2 |
| 6,731,350 B2 | * | 5/2004 | Endo et al. | 348/837 |
| 7,137,676 B2 | * | 11/2006 | Sugimoto et al. | 312/7.2 |
| 7,224,579 B2 | * | 5/2007 | Lee | 361/681 |
| 2002/0005897 A1 | | 1/2002 | Kim | |

FOREIGN PATENT DOCUMENTS

| | | |
|---|---|---|
| KR | 2000-0011042 | 6/2000 |
| KR | 2002-0006075 | 1/2002 |

\* cited by examiner

Primary Examiner—M. Lee
(74) Attorney, Agent, or Firm—NSIP Law

(57) ABSTRACT

The present invention relates to a driving assembly of an audio/video system, more particularly, to a driving assembly of an audio/video system for a vehicle, in which a motor part and a back-and-forth motion member are mounted on a low-surface chassis, and a connecter mounted on the motor part is connected to a main printed circuit board and cable for controlling a motor. Thus, if there are faulted parts in the motor part or the back-and-forth motion member, or in other parts for controlling the motor part of the main printed circuit board, any one can easily identify and see the faulted parts to be changed or repaired, simply by separating the main chassis from the low-surface chassis. As a result, assembly efficiency of the driving assembly of the AV system is much improved.

7 Claims, 5 Drawing Sheets

FIG. 1    PRIOR ART
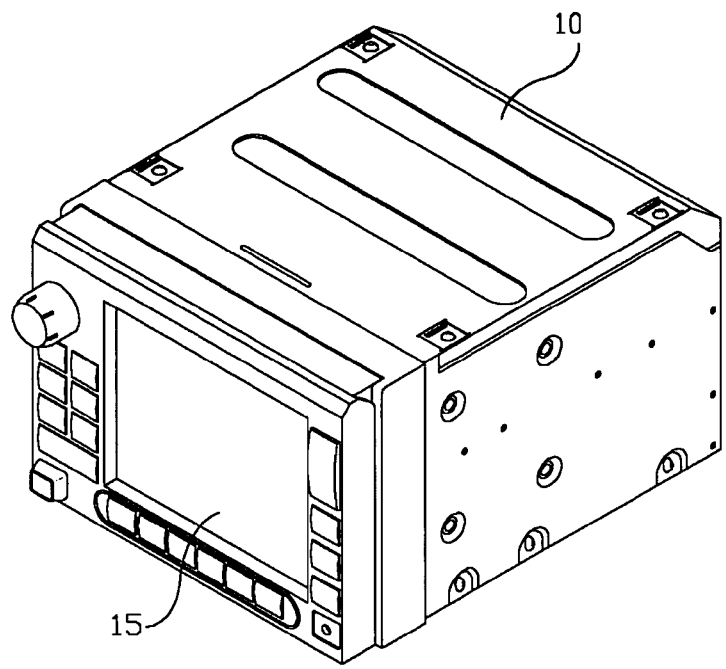
FIG. 2    PRIOR ART
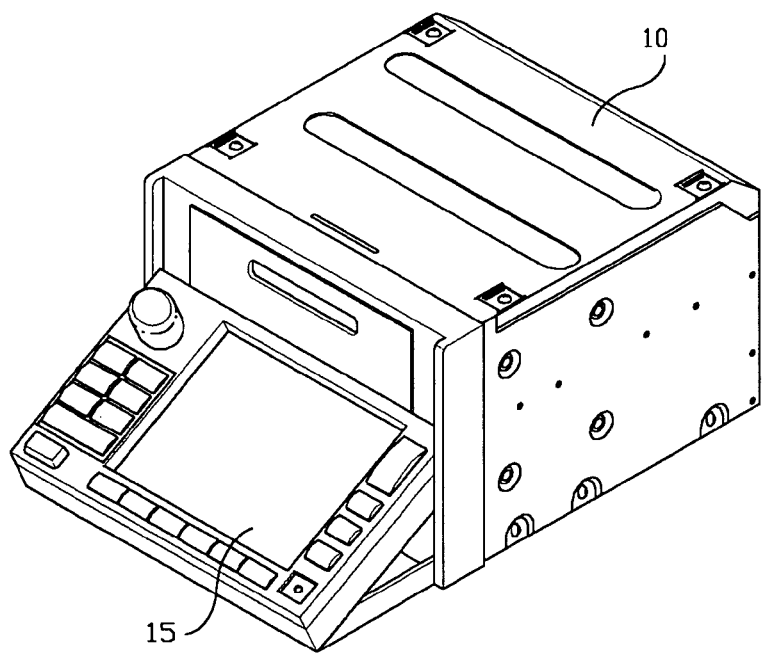

FIG. 5　PRIOR ART

DRIVING ASSEMBLY OF AUDIO/VIDEO SYSTEM FOR A VEHICLE

The present disclosure relates to subject matter contained in priority Korean Application No. 10-2003-0063543, filed on Sep. 15, 2003, which is herein expressly incorporated by reference in its entirety.

BACKGROUND OF THE INVENTION

1. Field of the Invention

The present invention relates to a driving assembly of an audio/video system, more particularly, to a driving assembly of an audio/video system for a vehicle, in which a motor part and a back-and-forth motion member are mounted on a low-surface chassis, and a connecter mounted on the motor part is connected to a main printed circuit board and cable for controlling a motor.

2. Description of the Related Art

As more luxurious cars become popular among people, a variety of luxurious in-vehicle options are being introduced. Among the options are communication devices that provide drivers to access every kind of information, such as continually updated traffic information, road information, and map to a destination. One of typical examples is an audio/video system (hereinafter it is referred to as an 'AV system') for a vehicle mounted with a device for watching TV or an automatic navigation system.

In general, a front panel of such AV system forms a monitor, and a cassette player or compact disk player of a car audio is housed in the front panel. Therefore, when a driver wants to watch the monitor or change a cassette tape in the cassette player, the monitor is tilted at a designated angle.

An AV system comprising this type of monitor tilting apparatus was disclosed in Korean Patent Publication No. 2002-0006075 and Korean Utility Model Publication No. 2000-0011042.

An AV system with an existing monitor tilting apparatus is depicted in FIGS. 1 through 5. More specifically, FIG. 1 is a perspective view of a related art AV system with a monitor tilting apparatus, FIG. 2 is a perspective view of the monitor in FIG. 1, in which the monitor is being tilted, FIG. 3 is a perspective view of a low-surface chassis of FIG. 2, FIG. 4 is a cross-sectional view taken along line A-A in FIG. 3, and FIG. 5 is a cross-sectional view taken along line B-B in FIG. 3.

As shown in FIGS. 1 and 2, the AV system having an existing monitor tilting apparatus includes a main body 10 that is built in a cartridge on the body of a car. On a front surface of the main body 10 is a monitor 15, which is tiltable.

On the low-surface chassis 20 disposed at a lower end of the main body 10 is a slide chassis 30, as depicted in FIG. 3, through which the monitor 15 can move back and forth. At this time, a lower end of the monitor 15 is connected to a monitor mounting part 38 of the slide chassis 30.

Meanwhile, a long hole 35 is formed on the slide chassis 30 back and forth, enabling a motor part 50 and a back-and-forth motion member 60 to be mounted on the low-surface chassis 20. A support bar 21 is placed on the low-surface chassis around the hole 35 formed on the slide chassis 30, and a main printed circuit board 11 is mounted on the support bar 21, being inside out. As shown in FIG. 4, on the support bar 21 is the motor part 50 including a motor 53 and a worm 55. The main printed circuit board 11 has a plurality of control means for the motor part 50. The worm 55 of the motor part 50 is engaged (or meshed) with a wormwheel 61, and the wormwheel 61 is engaged with a wheel 63. Shafts of the wheel 63 and the wormwheel 61 are mounted on the low-surface chassis 20. The wheel 63 is again engaged with a rack gear part 37 of the slide chassis 30.

As shown in FIG. 5, there is a plurality of guide shafts 21 fixed on the right and left sides of the low-surface chassis, and guide rollers 23 are positioned centering around the guide shafts 21. Also, long holes 31 are formed on the slide chassis 30 centering around the guide rollers 23 in such a manner that when the slide chassis 30 moves, the long holes 31 move back and forth with respect to the guide rollers 23. In short, the guide rollers 23, as their name implies, play as a guide for the slide chassis 30.

However, the AV system with the above monitor tilting apparatus poses problems.

For instance, since the motor part 50 and the back-and-forth motion member 60 are mounted on the lower side of the main printed circuit board 11 which is attached to the low-surface chassis 20 with the help of the support bar 21, they are not visible to naked eyes, and thus it is pretty difficult to assemble them.

Moreover, a variety of means for controlling the motor part 50 of the main printed circuit board 11, the motor part 50, and the back-and-forth motion member 60 and so forth are not easy to see with naked eyes. In other words, it is very hard to identify any troubles or deteriorations in them, and to assemble or change with new ones. As a result, their assembability is lowered.

SUMMARY OF THE INVENTION

It is, therefore, an object of the present invention to provide a driving assembly of an audio/video system for a vehicle with improved assembability and productivity and less defects in products, in which diverse parts in a motor part, a back-and-forth motion member or a main printed circuit board are easily seen to naked eyes simply by separating a main chassis and a low-surface chassis, whereby any one can easily change or repair parts.

Another object of the present invention is to provide a driving assembly of an audio/video system for a vehicle, in which a motor is more firmly fastened by means of a bracket that support the motor.

Still another object of the present invention is to provide a driving assembly of an audio/video system for a vehicle having a reinforced slide chassis structure by reinforcing a relatively weak long hole area.

To achieve the above object, there is provided a driving assembly of an AV system for a vehicle having a tiltable monitor disposed at a front surface of a main body of the AV system, the driving assembly including: a low-surface chassis disposed at a lower end of the main body; and a slide chassis mounted on the low-surface chassis, moving a lower side of the monitor back and forth, wherein a back-and-forth motion member for moving a motor part and the slide chassis back and forth, using power provided by the motor part, is mounted on the low-surface chassis.

In the embodiment, a connecter is mounted on the motor part, and the connector is connected to a main printed circuit board and cable for controlling the motor.

Here, the main printed circuit board is attached to the main body.

In the embodiment, the motor part includes: a motor; a printed circuit board mounted with the connector, being attached to one end of the motor; and a worm attached to the other hand of the motor, for transferring power from the motor to the back-and-forth motion member.

In the embodiment, the back-and-forth motion member includes: a wormwheel to be engaged with the worm, and a wheel, one end thereof being engaged with the wormwheel and the other end thereof being engaged with a slide chassis.

With the above structure, if there are faulted parts in the motor part or the back-and-forth motion member, or in other parts for controlling the motor part of the main printed circuit board, any one can easily identify and see the faulted parts to be changed or repaired, simply by separating the main chassis from the low-surface chassis, thereby improving assembability.

As a result, defective products are considerably reduced, and productivity is much improved.

Further, attaching the bracket for supporting the motor part to the low-surface chassis, the motor, it being supported by the bracket, is more firmly fastened on the low-surface chassis.

Moreover, attaching at least one reinforcing bracket to the slide chassis, the relatively weak long hole area of the slide chassis can be reinforced and strengthened.

BRIEF DESCRIPTION OF THE DRAWINGS

The above objects, features and advantages of the present invention will become more apparent from the following detailed description when taken in conjunction with the accompanying drawings, in which:

FIG. 1 is a perspective view of a related art AV system with a monitor tilting apparatus;

FIG. 2 is a perspective view of the monitor in FIG. 1, in which the monitor is being tilted;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 3:
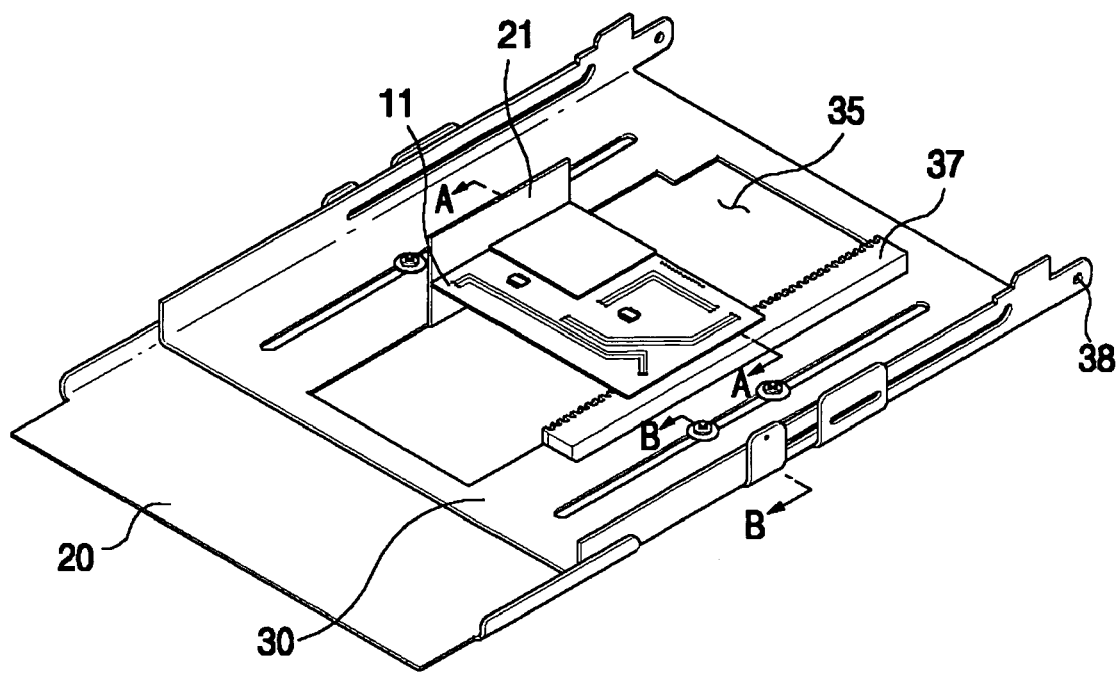
FIG. 3 is a perspective view of a low-surface chassis of FIG. 2.
Figure 4:
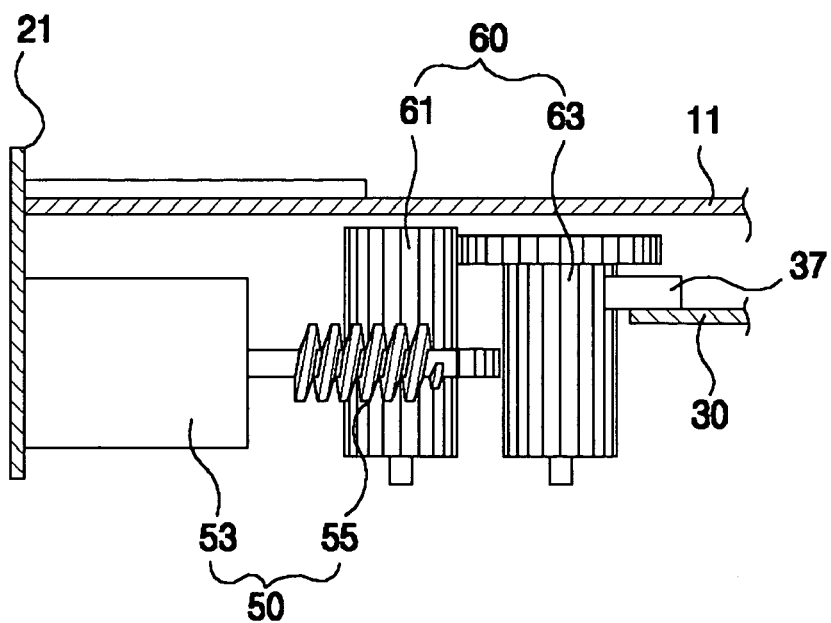
FIG. 4 is a cross-sectional view taken along line A-A in FIG. 3.
Figure 5:
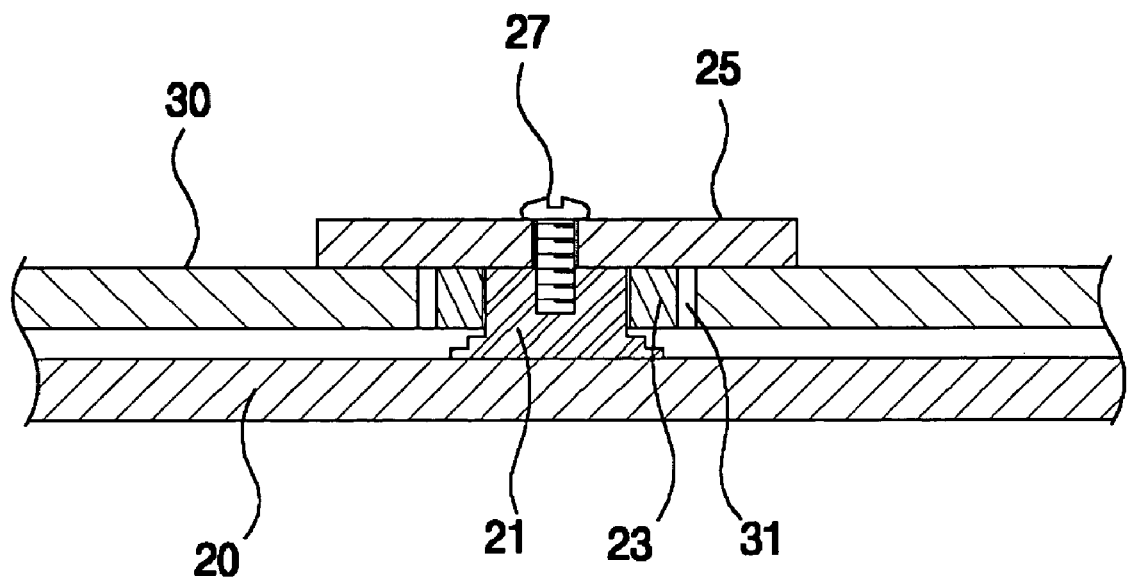
FIG. 5 is a cross-sectional view taken along line B-B in FIG. 3.
Figure 6:
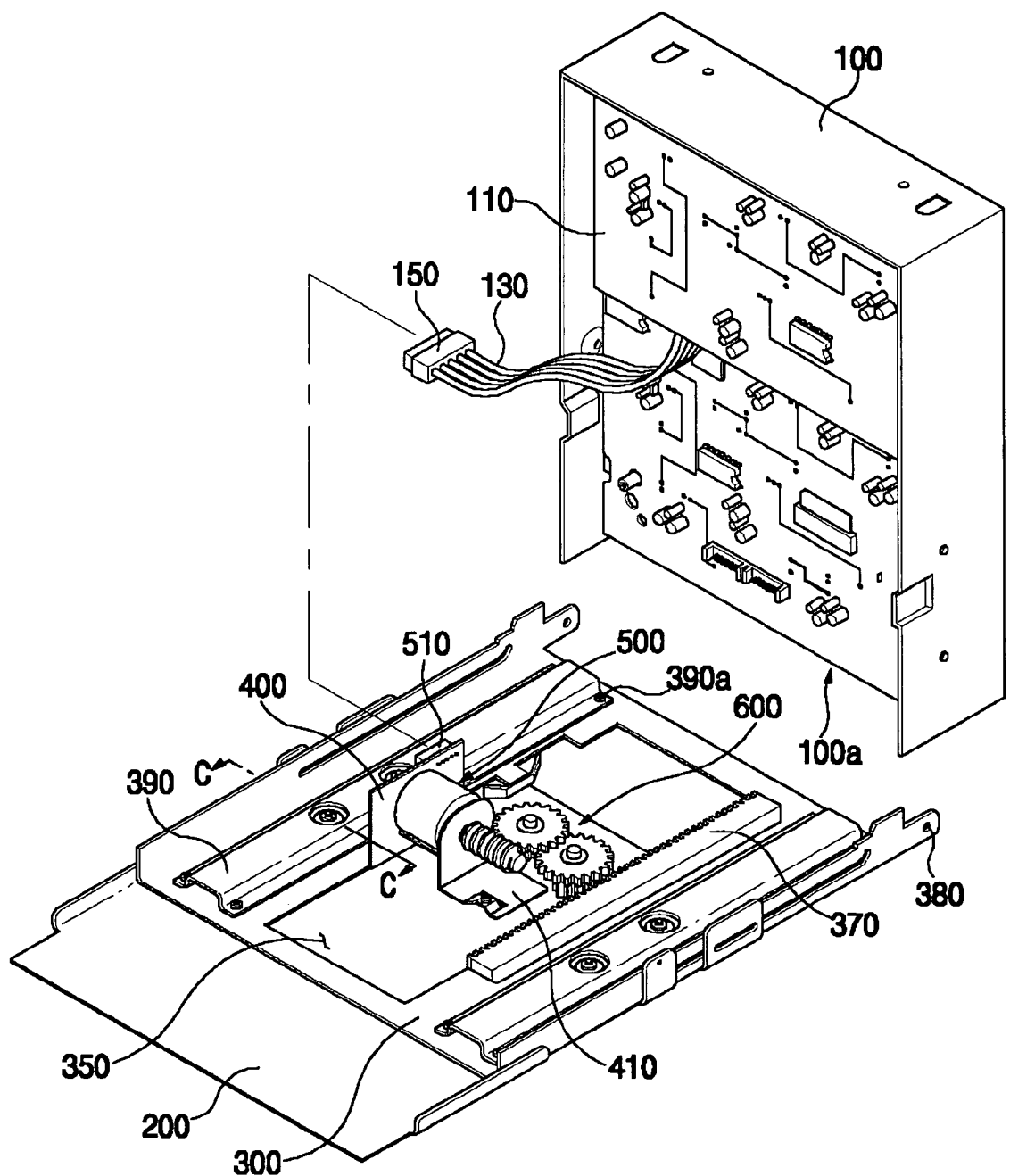
FIG. 6 is a perspective view of a driving assembly of an audio/video system for a vehicle according to a preferred embodiment of the present invention.
Figure 7:
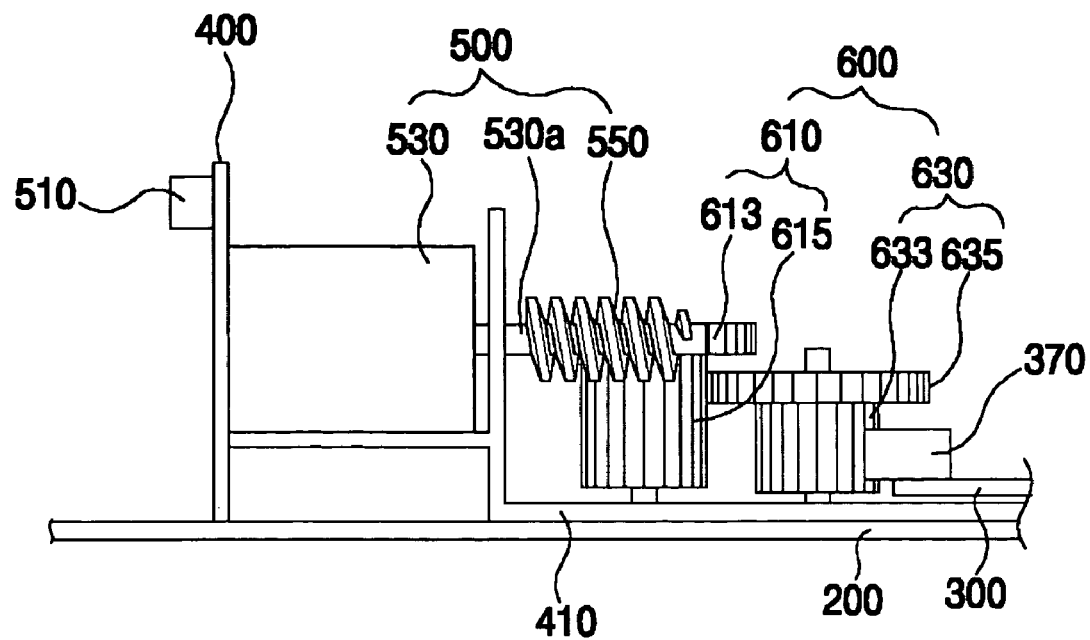
FIG. 7 is an enlarged side view of a motor part and a back-and-forth member in FIG. 6.
Figure 8:
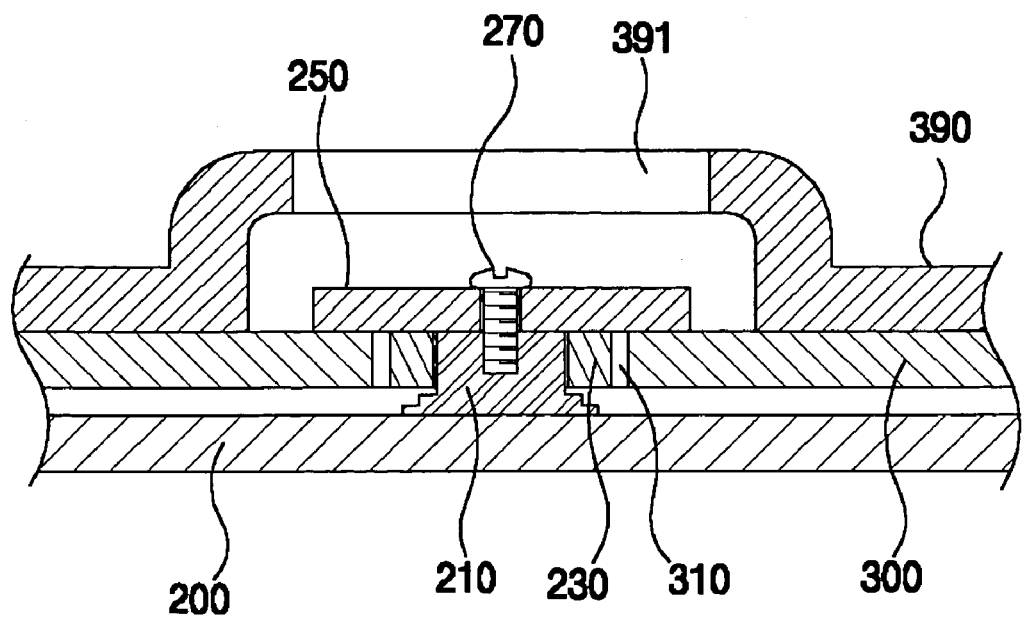
FIG. 8 is a cross-sectional view taken along line C-C in FIG. 7.

FIG. 6 is a perspective view of a driving assembly of an audio/video system for a vehicle according to a preferred embodiment of the present invention, FIG. 7 is an enlarged side view of a motor part and a back-and-forth member in FIG. 6, and FIG. 8 is a cross-sectional view taken along line C-C in FIG. 7.

As depicted in FIG. 6, the driving assembly of an A/V system with a tiltable monitor disposed at a front surface of a main body includes a low-surface chassis 200 positioned at a lower end of the main chassis 100, a slide chassis 300 attached to the low-surface chassis 200, a motor part 500 positioned at the low-surface chassis 200, and a back-and-forth motion member 600 for moving the slide chassis back and forth using power provided by the motor part 500.

As mentioned before, the monitor (not shown) is disposed at the front surface of the main body 100 of the AV system, and a main printed circuit board 110 is housed in the main body 100.

One thing to be aware of in FIG. 6 is that to show inside of the main body 100, the front surface 100a of the main body 100 is upside down in the drawing.

The main printed circuit board 110 has diverse parts for controlling a motor part 500, and a cable 130 connected to a connector 150.

Also, a plurality of guide shafts 210 are fixed in the right and left sides of the low-surface chassis 200.

As FIG. 8 illustrates, a fastening hole (not shown) to which a bolt 270 is inserted is formed on a top end of the respective guide shafts 210, and guide rollers 230 for guiding the slide chassis 300 are installed, centering around the guide shafts 210.

On the slide chassis 300 is a long hole 310 to which guide rollers 230 are inserted, enabling the slide chassis 300 to move back and forth.

As such, guide rollers 230 of the guide shafts 210 fasted onto the low-surface chassis 200 are inserted to the long hole 310 of the slide chassis 300, and thus, the guide shafts 210 are protruded to the long hole 310. A washer 250 is mounted on the respective guide shafts 210, to inhibit the guide roller 230 from derailing, and then the bolt 270 is inserted to the fastening hole of the guide shaft 210.

Preferably, a "⊂"-shaped reinforcing bracket 390 is formed along the long hole 310 formed on the slide chassis 300. This reinforcing bracket 390 is fastened onto the slide chassis by means of a plurality of fastening means 390a, e.g. bolts.

Accordingly, the reinforcing bracket 390 formed along the long hole 310 on the slide chassis 300 serves to reinforce and strengthen the long hole area that is a relatively weak portion of the slide chassis 200.

Also, in order to make an assembly work with bolts 270 and the guide shafts 210, i.e. fastening the guide shafts onto the slide chassis using the bolts, an assembly hole 391 is preferably drilled into a position on the reinforcing bracket 390 where guide shafts 210 are attached.

As such, drilling the assembly hole 391 into the reinforcing bracket 390, a driver can easily change the washer 250, the guide shafts 210 and the guide rollers 230 and so forth, simply by inserting a tool to the assembly hole 391 to loose or fasten a bolt. In other words, now that the reinforcing bracket needs not to be separated from the slide chassis, the convenience and assembability are improved.

Both ends of the slide chassis 300 are monitor mounting parts 380 on which the lower end of the monitor is placed.

A long hole 350 is formed on a central portion of the slide chassis 300 in such a manner that the motor part 500 and the back-and-forth motion member 600 can be mounted on the low-surface chassis 200.

As illustrated in FIG. 7, the motor part 500 includes a motor 530, a printed circuit board 400 attached to one end of the motor 530, and a worm 550 attached to the other end of the motor 530, transferring power from the motor 530 to the back-and-forth motion member 600.

Specifically, the printed circuit board 400 is fastened on the low-surface chassis 200, and the motor 530 is attached to the printed circuit board 400. One side of the printed circuit board 400 is a connecter 510.

The worm 500 is attached to a motor shaft 530a, and it rotates as the motor 530 starts driving.

In the meantime, there is a bracket 410 attached to the motor 530, to support the low surface of the motor 530 and the motor shaft 530*a*. Thanks to this bracket 410, the motor 530 is more firmly fastened on the printed circuit board 400.

The back-and-forth motion member 600 includes a wormwheel 610, which is engaged with a worm 550, and a wheel 630, one end thereof being engaged with the wormwheel 610 and the other end being engaged with the slide chassis 300.

More specifically speaking, the wormwheel 610 constitutes a head 613 and a body 615, each having gear teeth. And, a shaft at the center of the wormwheel 610 is mounted on the low-surface chassis 200.

Similar to the wormwheel 610, the wheel also constitutes a head 633 and a body 635, each having gear teeth. And, a shaft at the center of the wheel 630 is mounted on the low-surface chassis 200.

The head 633 of the wheel is engaged with the body 615 of the wormwheel 610.

The body 635 of the wheel is engaged with a rack gear part 370 that is formed on the slide chassis 300 in a direction of the slide chassis' motion.

An operation of the embodiment having the above structure is now discussed below.

As for assembling the low-surface chassis 200 mounted with the slide chassis 300 with the main chassis 100, the connector 150 of a cable 130 of the main printed circuit board 110 fixed to the main chassis 100 is inserted to the connector 510 of the printed circuit board 400 fixed to the low-surface chassis 200. Then, the main chassis 100 and the low-surface chassis 200 are put together, and fastened to each other by a fastening means, e.g. bolt.

As for tilting the monitor, a vehicle driver presses a switch to drive the motor part 500. Then the wormwheel 610 of the motor 530 starts rotating, and the wormwheel 610 being perpendicularly meshed (or engaged) with the wheel 630 starts rotating. Since this wormwheel 610 is engaged with the wheel 630, the wheel 630 also starts rotating. At this time, because the wheel 630 has a larger diameter than that of the wormwheel 610, it plays as a reduction gear, reducing the speed.

To be short, as the wheel 630 rotates, the rack gear part 370 of the slide chassis 300 being engaged with the wheel 630 makes a straight-line motion to the front, and thus, the slide chassis 300 moves forward.

On the other hand, if the driver presses the switch one more time, the motor shaft 530 rotates in a reverse direction, and the wormwheel 610 also rotates in a reverse direction of the above. As a result, the wormwheel 610 and the wheel 630 rotate in a reverse direction of the above, and the rack gear part 370 of the slide chassis 300 moves backward.

To repair or change faulted parts in the motor part 500 or the back-and-forth motion member 600, given that the AV system has the above driving assembly being discussed so far, the main chassis 100 is first separated from the low-surface chassis 200, and the connector 150 of the main printed circuit board 110 is separated from the connector 510 of the printed circuit board 400.

The present invention, unlike the related art, has better assemability because one can actually see the motor part 500 and the back-and-forth motion member 600 mounted on the low-surface chassis 200 when changing or repairing faulted parts.

Besides, once the main chassis 100 and the low-surface chassis 200 are separated from each other, other kinds of parts for controlling the motor part 500 of the main printed circuit board 110 are also visible to naked eyes.

In this manner, defective products are considerably reduced, and productivity is much improved.

In conclusion, the driving assembly of the AV system of the present invention has the following advantages.

First, the driving assembly of the AV system of the invention has better assemability. More specifically, according to the driving assembly of the invention, the motor part and the back-and-forth motion member for moving the slide chassis back and forth using power provided by the motor part are mounted on the low-surface chassis, and the connector attached to the motor part is connected to the main printed circuit board and the cable for controlling the motor. Hence, if there are faulted parts in the motor part or the back-and-forth motion member, or in other parts for controlling the motor part of the main printed circuit board, any one can easily identify and see the faulted parts to be changed or repaired, simply by separating the main chassis from the low-surface chassis.

As a result, defective products are considerably reduced, and productivity is much improved.

Second, attaching the bracket for supporting the motor part to the low-surface chassis, the motor, it being supported by the bracket, is more firmly fastened on the low-surface chassis.

Third, attaching at least one reinforcing bracket to the slide chassis, the relatively weak long hole area of the slide chassis can be reinforced and strengthened.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A driving assembly of an AV system for a vehicle having a tiltable monitor disposed at a front surface of a main body of the AV system, the driving assembly comprising:
   a main printed circuit board attached to the main body;
   a low-surface chassis disposed at a lower end of the main body;
   a slide chassis mounted on the low-surface chassis, said slide chassis moves a lower side of the monitor back and forth and includes a plurality of reinforcement brackets;
   a secondary printed circuit board disposed on the low-surface chassis
   a motor part mounted to the secondary printed circuit board disposed on the low-surface chassis;
   a motor part mounted to the secondary printed circuit board and the low-surface chassis;
   a back-and-forth motion member that moves the slide chassis back and forth in response to a rotational force of the motor part; and
   a connector which is mounted on the secondary printed circuit board, the connector connects the secondary printed circuit board to the main printed circuit board by a cable for controlling a motor of the motor part, wherein the motor part comprises:
   the motor;
   the secondary printed circuit board mounted with the connector that is attached to one end of the motor; and
   a worm attached to the other hand of the motor, for transferring power from the motor to the back-and-forth motion member.

2. The driving assembly of claim 1, wherein the back-and-forth motion member comprises:
   a wormwheel engaged with the worm, and a wheel, one end thereof being engaged with the worm-wheel and an other end thereof being engaged with the slide chassis.

3. The driving assembly of claim 1, wherein a bracket for supporting the motor part is further mounted on the low-surface chassis.

4. The driving assembly of claim 1, wherein at least one reinforcing bracket comprises a c-shape.

5. A driving assembly of an AV system that includes a tiltable monitor, the driving assembly comprising:
- a low-surface chassis disposed at a lower end of a main body;
- a slide chassis mounted on the low-surface chassis, said slide chassis moves a lower side of the tiltable motor back and forth;
- a back-and-forth motion member responsive to a motor part mounted on a bracket to the low-surface chassis and which moves the slide chassis back and forth;
- a main printed circuit board attached to the main body;
- a secondary printed circuit board attached to the motor part;
- a connector attached to the secondary printed circuit board;
- a cable for connecting the main printed circuit board to the connector on the secondary printed circuit board; and
- at least one reinforcing bracket mounted on the slide chassis.

6. A driving assembly of an AV system for a vehicle having a tiltable monitor disposed at a front surface of a main body of the AV system, the driving assembly comprising:
- a low-surface chassis disposed at a lower end of the main body;
- a slide chassis mounted on the low-surface chassis, said slide chassis moves a lower side of the monitor back and forth;
- a secondary printed circuit board disposed on the low-surface chassis;
- a motor disposed on the low-surface chassis;
- a connector mounted on the secondary printed circuit board for inputting signals to the motor;
- a back-and-forth motion member that moves the slide chassis back and forth in response to a rotational force of the motor;
- a cable, having a connector attached to a first end, for connecting a first end of the cable to the connector; and
- a main printed circuit board, attached to the main body, and being connected to a second end of the cable;
- wherein when the main body is separated from the low-surface chassis, the motor is exposed for visual inspection or replacement, without removing the main printed circuit board from the AV system, and
- wherein the driving assembly includes at least a first c-shaped bracket disposed on the slide chassis for reinforcing an elongate hole in the slide chassis.

7. The driving assembly of claim 6 wherein the driving assembly includes a second c-shaped bracket disposed on the slide chassis.

* * * * *